(12) United States Patent
Oi et al.

(10) Patent No.: US 7,873,447 B2
(45) Date of Patent: Jan. 18, 2011

(54) POSITION ESTIMATION APPARATUS, POSITION ESTIMATION METHOD AND PROGRAM RECORDING MEDIUM

(75) Inventors: Kenichiro Oi, Kanagawa (JP); Masahiro Fujita, Saitama (JP); Takayuki Yoshigahara, Tokyo (JP); Steffen Gutmann, Tokyo (JP); Masaki Fukuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 919 days.

(21) Appl. No.: 11/745,947

(22) Filed: May 8, 2007

(65) Prior Publication Data

US 2007/0265741 A1 Nov. 15, 2007

(30) Foreign Application Priority Data

May 9, 2006 (JP) .............................. 2006-130602

(51) Int. Cl.
*G06F 17/00* (2006.01)
(52) U.S. Cl. .......................... 701/23; 701/207; 701/300
(58) Field of Classification Search .................. 701/23, 701/25–26, 207, 300; 180/167
See application file for complete search history.

(56) References Cited

U.S. PATENT DOCUMENTS 5,592,401 A * 1/1997 Kramer ....................... 702/153

FOREIGN PATENT DOCUMENTS

JP 2006-011880 1/2006

OTHER PUBLICATIONS

Gary Welch et al., "An Introduction to the Kalman Filter", Technical Report 95-041, Department of Computer Science, University of North Carolina, Chapel Hill, Jul. 24, 2006.
Andrew J. Davis, "Real-Time Simultaneous Localisation and Mapping with a Single Camera", Proceedings of the 9$^{th}$ IEEE International Conference on Computer Vision, 2003.

* cited by examiner

*Primary Examiner*—Yonel Beaulieu
(74) *Attorney, Agent, or Firm*—Finnegan, Henderson, Farabow, Garrett, & Dunner, L.L.P.

(57) ABSTRACT

The present invention provides a position estimation apparatus capable of determining whether an estimated value deviates from an actual value and trying a process to correct the estimated value if the estimated value is determined to be incorrect. The position estimation apparatus employs a position prediction unit configured to produce a prediction of the position of a mobile object having an odometry sensor mounted thereon, an environment observation unit configured to keep track of each feature point in the environment of the mobile object, a prediction-error check unit configured to determine whether the position prediction produced by the position prediction unit is correct or incorrect, a position-prediction correction unit configured to correct a wrong position prediction and a position/posture updating unit configured to update the position and/or posture of the mobile object on the basis of a correct position prediction.

8 Claims, 8 Drawing Sheets

CORRECT PREDICTION

INCORRECT PREDICTION

POSITION ESTIMATION APPARATUS, POSITION ESTIMATION METHOD AND PROGRAM RECORDING MEDIUM

CROSS REFERENCES TO RELATED APPLICATIONS

The present invention contains subject matter related to Japanese Patent Application JP 2006-130602 filed in the Japan Patent Office on May 9, 2006, the entire contents of which being incorporated herein by reference.

BACKGROUND OF THE INVENTION

1. Field of the Invention

The present invention relates to a position estimation apparatus for estimating the position of a mobile object having a sensor such as a camera mounted thereon, as well as relates to a position estimation method to be adopted in the position estimation apparatus and a program recording medium used for recording a position estimation program implementing the position estimation method.

2. Description of the Related Art

In a mobile object having a group of sensors mounted thereon as sensors of 2 types, i.e., odometry sensors such as an acceleration sensor and a velocity sensor and image-taking sensors such as a distance sensor, the position and posture of the mobile object itself are estimated by making use of information provided by the group of sensors. Examples of the mobile object are a self-advancing or autonomic robot and a car. A mobile object needs to explore movement routes avoiding obstructions in an environment of the mobile object itself. In this case, the mobile object measures three-dimensional information of the surrounding environment for example by making use of a stereo vision. Then, the mobile object obtains environment information from the three-dimensional information. Finally, the mobile object estimates its own posture and position in the environment of the mobile object by making use of the group of sensors.

For example, Japanese Patent Laid-open No. 2006-11880 (hereinafter referred to as Patent Document 1) discloses a mobile robot capable of creating a threes dimensional map representing occupancy states of three-dimensional grids on the basis of external states detected by an external-state detection means, changing information extracted from a map of surface heights relative to a reference on the basis of information provided by the three-dimensional map and controlling movement operations by taking the changed map information as an environment map and by autonomously determining a movement route. In the case of a car, the position of the car is estimated by the car itself when the GPS or the like is not available. The GPS or the like is not available for example when the car is running through a tunnel.

FIG. 8 is a diagram showing a robot 40 having an odometry sensor 41 and vision sensor 42 mounted thereon in a condition of a fixed (unchanging) environment. The environment is fixed and the positions of feature points 43 to 47 are known. A personal computer 48 adopts an algorithm for estimating the position of the robot 40 on the basis of the positions of the feature points 43 to 47 by making use of a prediction filter such as the Kalman filter or the like. To put it in detail, sensor values generated by the odometry sensor 41 and the vision sensor 42 are typically transmitted to the personal computer 48 for example by making use of radio signals. The personal computer 48 receives the sensor values and estimates the position of the robot 40 on the basis or the known positions of the feature points 43 to 47 by making use of a prediction filter such as the Kalman filter or the like.

For example, "An Introduction to the Kalman Filter," Greg Welch, Gary Bishop, Technical Report 95-041, Department of Computer Science, University of North Carolina (1995) (hereinafter referred to as Non-Patent Document 1) discloses the Kalman filter. The Kalman filter is a filter used for computing a state, which cannot be observed directly, from indirect information in order to give an optimum estimated value. An example of the computed state is the present state of a car, and the present state of the car is represented by the position, velocity and acceleration of the car. The state is expressed in terms of quantities based on a probability distribution model. As the probability distribution model, for example, a normal distribution can be adopted.

FIG. 9 shows a flowchart representing the algorithm of the Kalman filter. As shown in the figure, the flowchart begins with an initialization step S0 followed by a state prediction step S1. The prediction step S1 is followed by an environment observation step S2, which is succeeded by a position/posture updating step S3. The state prediction step S1 is the step of predicting the state of a robot for the present frame from values generated by the odometry sensor 41 including an acceleration sensor and a velocity sensor as well as a result of estimating the state (or the position) of a system (that is, the robot) for the preceding frame. Since the values output by the odometry sensor 41 and the robot position produced from an image taken by a camera for the preceding frame are past information, however, the robot position (or the robot state) computed from the values output by the odometry sensor 41 and the information originated by the camera is no more than a predicted value. The environment observation step S2 is the step of measuring the environment of the mobile object by making use of the vision sensor 42, which is other than the odometry sensor 41 used at the position prediction step S1. An example of the vision sensor 42 is the camera cited above. To put it concretely, the image of the environment is taken by making use of the vision sensor 42 mounted on the robot 40 and, from the taken image, the feature points 43 to 47 are observed. The feature points 43 to 47 are marks that can be recognized in image processing. Examples of feature points 43 to 47 are eyemarks and landmarks. The position/posture updating step S3 is the step of updating and correcting the posture and/or position of the robot 40 on the basis of observation results obtained at the step S2 as results of observing the feature points 43 to 47. A method of updating the state of the robot 40 is the same as a general extended Kalman filtering method described in Non-Patent Document 1 as a nonlinear technique. In this case, the state of the robot 40 is the position and/or posture of the robot 40.

SUMMARY OF THE INVENTION

By the way, in a position estimation system adopting the algorithm represented by the flowchart shown in FIG. 9 as the algorithm of the Kalman filter, even if an estimated value of a position much deviates from an actual value, the computation is continued undesirably with the estimated value deviating from the actual value as it is. Thus, the conventional self estimation system adopting the algorithm of the Kalman filter is not robust. In addition, in most systems, next estimation is carried out by discarding accumulated information and re-initializing the position to be estimated if present estimation is known to have been done incorrectly. This is because the locus observed from correct estimated values as the locus of the position detected by the sensor system is not usable in case the present estimation is determined to be incorrect.

Addressing the problems described above, inventors of the present invention have innovated a position estimation apparatus capable of producing a result of determination as to whether or not an estimated value deviates from the actual value and trying a recovery to correct the estimated value if the result of the determination indicates that the estimated value deviates from the actual value as well as innovated a position estimation method to be adopted in the position estimation apparatus and a program recording medium for storing a position estimation program implementing the position estimation method.

In order to solve the problems described above, the present invention provides a mobile object with a position estimation apparatus employing:

a position prediction unit for driving a position prediction filter to carry out a filtering process on a sensor value generated by an odometry sensor mounted on the mobile object as a sensor value for the present frame and a result of estimating the position of the mobile object for a previous frame in order to produce a position prediction as a prediction of the position of the mobile object for the present frame;

an environment observation unit for measuring the environment of the mobile object by making use of an environment observation sensor other than the odometry sensor used by the position prediction unit and observing positions of feature points in the environment by keeping track of the feature points from frame to frame;

a prediction-error check unit for producing a result of determination as to whether a position prediction produced by the position prediction unit as a prediction of the position of the mobile object is correct or incorrect on the basis of a result generated by the environment observation unit as a result of an operation to keep track of the feature points in the environment;

a position prediction correction unit for correcting a position prediction produced by the position prediction unit as a prediction of the position of the mobile object if the prediction-error check unit produces a determination result indicating that the position prediction is incorrect; and a position/posture updating unit for updating the position and/or posture of the mobile object if the prediction-error check unit produces a determination result indicating that a position prediction produced by the position prediction unit as a prediction of the position of the motile object is correct.

In order to solve the problems described above, the present invention also provides a mobile object with a position estimation method including the steps of:

driving a position prediction filter to carry out a filtering process on a sensor value generated by an odometry sensor mounted on the mobile object as a sensor value for the present frame and a result of estimating the position of the mobile object for a previous frame in order to produce a position prediction as a prediction of the position of the mobile object for the present frame;

measuring the environment of the mobile object by making use of an environment observation sensor other than the odometry sensor used in the position prediction process and observing positions of feature points in the environment by keeping track of the feature points from frame to frame;

producing a result of determination as to whether a position prediction produced in the position prediction process as a prediction of the position of the mobile object is correct or incorrect on the basis of a result generated in the environment observation process as a result of an operation to keep track of the feature points in the environment;

correcting a position prediction produced in the position prediction process as a prediction of the position of the mobile object if the prediction-error check process produces a determination result indicating that the position prediction is incorrect; and updating the position and/or posture of the mobile object if the prediction-error check process produces a determination result indicating that a position prediction produced in the position prediction process as a prediction of the position of the mobile object is correct.

In order to solve the problems described above, the present invention also provides a mobile object with a recording medium used for recording a position estimation program to be executed by a position estimation apparatus for predicting the position of the mobile object. The position estimation program includes:

a position prediction process of driving a position prediction filter to carry out a filtering process on a sensor value generated by an odometry sensor mounted on the mobile object as a sensor value for the present frame and a result of estimating the position of the mobile object for a previous frame in order to produce a position prediction as a prediction of the position of the mobile object for the present frame;

an environment observation process of measuring the environment of the mobile object by making use of an environment observation sensor other than the odometry sensor used in the position prediction process and observing positions of feature points in the environment by keeping track of the feature points from frame to frame;

a prediction-error check process of producing a result of determination as to whether a position prediction produced in the position prediction process as a prediction of the position of the mobile object is correct or incorrect on the basis of a result generated in the environment observation process as a result of an operation to keep track of the feature points in the environment;

a position prediction correction process of correcting a position prediction produced in the position prediction process as a prediction of the position of the mobile object if the prediction-error check process produces a determination result indicating that the position prediction is incorrect; and a position/posture updating process of updating the position and/or posture of the mobile object if the prediction-error check process produces a determination results indicating that a position prediction produced in the position prediction process as a prediction of the position of the mobile object is correct.

It is to be noted that the present invention can also be applied to a case in which an external signal processing apparatus such as a personal computer shown in FIG. 8 receives radio or wire communication signals conveying values generated by an odometry sensor and an environment observation sensor, which are mounted on a robot, from the sensors, estimating the position of the robot by making use of a prediction filter such as the Kalman filter on the basis of feature points in an environment observed by the environment observation sensor as the environment of the robot.

In accordance with the present invention, an estimated value is examined in order to produce a result of determination as to whether or not the estimated value deviates from the actual value, and a recovery to correct the estimated value is tried if the result of the determination indicates that the estimated value deviates from the actual value. Thus, if the result of the determination indicates that the estimated value deviates from the actual value, a locus traced for the positions detected by a sensor system as a locus ending with the most recent position can be reflected by correction of the estimated positions detected by the sensor system in a recovery process. As a result, the present invention provides a robust position estimation system.

BRIEF DESCRIPTION OF THE DRAWINGS

FIG. 6A is an explanatory diagram to be referred to in description of a case in which the position prediction is correct whereas

FIG. 7A is an explanatory diagram to be referred to in description of a case in which an incorrect prediction of the position of a robot is expressed as a function of a one-dimensional variable whereas

DETAILED DESCRIPTION OF THE PREFERRED EMBODIMENTS

A preferred embodiment of the present invention is described by referring to diagrams as follows.

The following description begins with explanation of an embodiment implementing a position estimation apparatus 10 provided for a mobile object (such as a robot) placed in a condition of a fixed (unchanging) environment. The mobile object employs an odometry sensor and a vision sensor, which are mounted on the mobile object itself, and the position estimation apparatus 10 uses values generated by the odometry sensor and the vision sensor.

Figure 1:
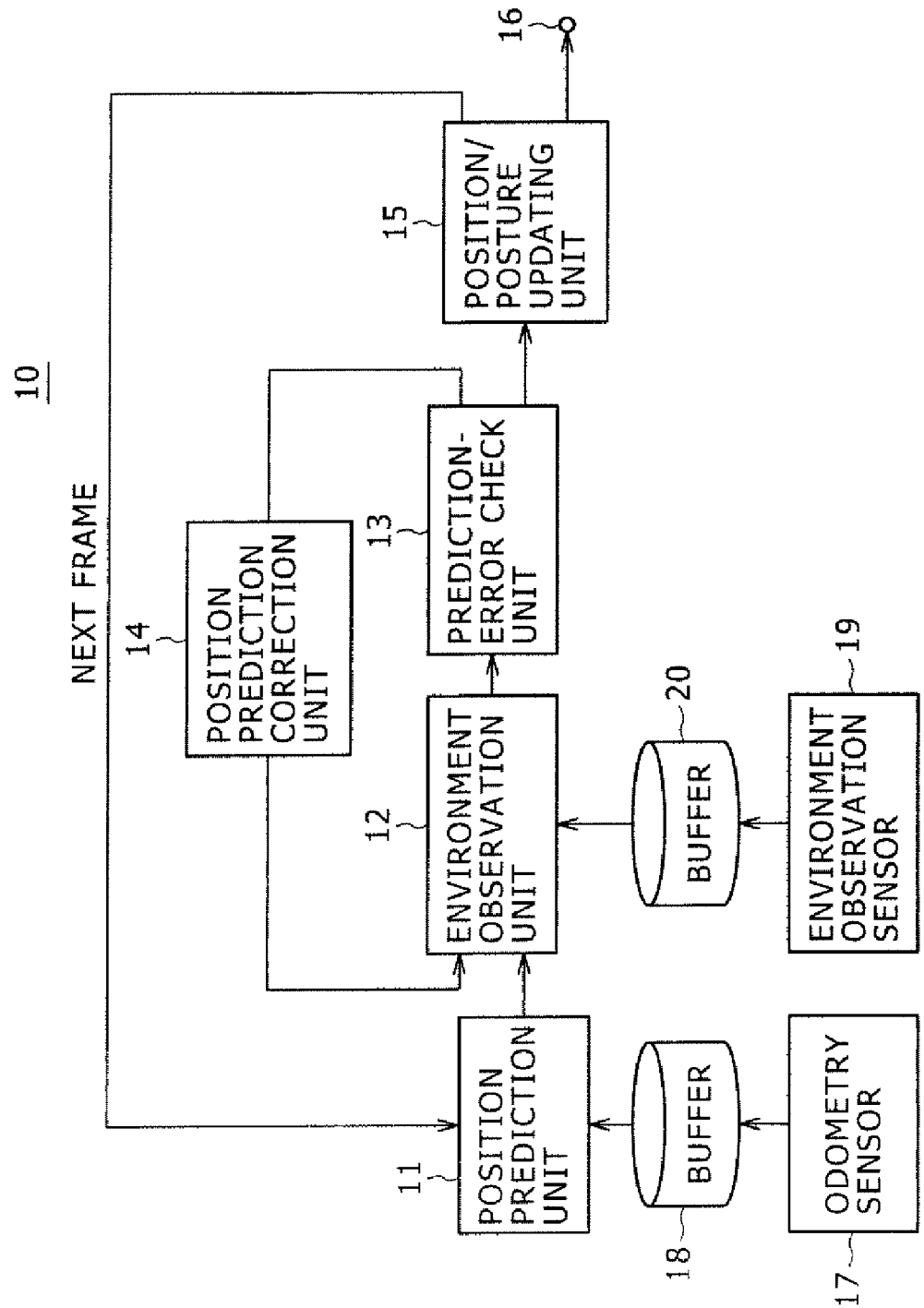
FIG. 1 is a block diagram showing the configuration of a position estimation apparatus.

FIG. 1 is a block diagram showing the functional configuration of the position estimation apparatus 10. To put it concretely, the configuration of hardware employed in the position estimation apparatus 10 includes a CPU, a RAM, a ROM, an HDD and a variety of sensors mounted on the mobile object. The CPU, the RAM, the ROM and the HDD are connected to each other by a bus. In the functional block diagram shown in FIG. 1, the CPU loads a position estimation program based on a position estimation method provided by the present invention from the HDD into the RAM also serving as work area and sequentially executes the program. As an alternative, the CPU directly executes the position estimation program stored in the ROM in advance. The program recording medium provided by the present invention as a medium used for storing the position estimation program is typically a CD-ROM or a semiconductor memory. In this case, the position estimation program needs to be installed in the HDD from the program recording medium in advance before being loaded into the RAM for execution. It is needless to say that an HD mounted on the HDD can be regarded as the program recording medium.

The position estimation apparatus 10 having functional blocks shown in FIG. 1 employs a position prediction unit 11, an environment observation unit 12, a prediction-error check unit 13, a position-prediction correction unit 14 and a position/posture updating unit 15. The position prediction unit 11 is a unit for predicting the position of the mobile object having the aforementioned sensors mounted thereon. The environment observation unit 12 is a unit for keeping track of feature points in an environment where the mobile object exists. The prediction-error check unit 13 is a unit for producing a result of determination as to whether a position prediction produced by the position prediction unit 11 as a prediction of the position of the mobile object is correct or incorrect. The position-prediction correction unit 14 is a unit for correcting a position prediction. The position/posture updating unit 15 is a unit for updating the position and/or posture of the mobile object on the basis of a correct position prediction.

The position prediction unit 11 is connected to a buffer 18. The buffer 18 is a memory used for storing sensor values generated by an odometry sensor 17 mounted on the mobile object along with other sensors. The position prediction unit 11 reads out sensor values from the buffer 18. In addition, the position prediction unit 11 also receives an estimated result of an updated position from the position/posture updating unit 15 to be used in a prediction operation carried out by the position prediction unit 11 for the next frame as an estimated result of an updated position for a previous frame. Thus, the position prediction unit 11 is capable of driving a position prediction filter to carry out a filtering process on a sensor value generated by the odometry sensor 17 as a sensor value for the present frame and a result of estimating the position of the mobile object having the sensors mounted thereon for a previous frame in order to predict the position of the mobile object for the present frame.

The odometry sensor 17 is an acceleration sensor, a velocity sensor or the like. The odometry sensor 17 is a sensor for detecting the acceleration or velocity of the mobile object.

The environment observation unit 12 is connected to a buffer 20. The buffer 20 is a memory used for storing sensor values generated by an environment observation sensor 19, which is other than the odometry sensor 17 used by the position prediction unit 11. The environment observation unit 12 reads out sensor values from the buffer 20. In addition, the environment observation unit 12 also receives predicted values corrected by the position-prediction correction unit 14 from the position-prediction correction unit 14. The environment observation unit 12 measures the environment of the mobile object by making use of the environment observation sensor 19 other than the odometry sensor 17 used by the position prediction unit 11 and observing positions of feature points in the environment by keeping track of the feature points from frame to frame. The environment observation unit 12 may keep track of the feature points by determining a search range on the basis of the predicted position and/or the predicted posture, which are found by the position prediction unit 11. In this case, the environment observation unit 12 estimates the position of every feature point in an image from a position known in advance as the position of the feature point in a three-dimensional space and from data estimated by the Kalman filter as the positional data of the mobile object. Then, the environment observation unit 12 deforms a template seen from the position of the mobile object as a template of the vicinity of each of the feature points in accordance with affinity constraints on the basis of luminance image data in the vicinity of each feature point and on the basis of posture data of the luminance image in the vicinity of each of the feature points. Finally, the environment observation unit 12 keeps track of the feature points by adoption of a template matching technique on the basis of the search range and the template.

The prediction-error check unit 13 is a unit for producing a result of determination as to whether a position prediction produced by the position prediction unit 11 as a prediction of the position of the mobile object is correct or incorrect on the basis of a result generated by the environment observation unit 12 as a result of an operation to keep track of the feature points in the environment. To put it concretely, the prediction-error check unit 13 counts the number of feature points successfully detected in the operation carried out by the environment observation unit 12 to keep track of feature points and the number of feature points not detected in the same operation, which ends in a failure. If the operation to keep track of feature points has been carried out by the environment observation unit 12 at a success rate higher than a certain probability, the prediction-error check unit 13 produces a determination result indicating that the position prediction produced by the position prediction unit 11 as a prediction of the position of the mobile object is correct. Otherwise, the prediction-error check unit 13 produces a determination result indicating that the position prediction produced by the position prediction unit 11 as a prediction of the position of the mobile object is incorrect.

The position-prediction correction unit 14 is a unit for correcting a position prediction if the prediction-error check unit 13 produces a determination result indicating that the position prediction produced by the position prediction unit 11 as a prediction of the position of the mobile object is incorrect. To put it concretely, if the prediction-error check unit 13 produces a determination result indicating that the position prediction produced by the position prediction unit 11 as a prediction of the position of the mobile object is incorrect, the position-prediction correction unit 14 changes an existence probability distribution model in order to increase the value of the standard deviation of the model, that is, in order to increase the width of the search range used by the environment observation unit 12.

If the prediction-error check unit 13 produces a determination result indicating that the position prediction produced by the position prediction unit 11 as a prediction of the position of the mobile object is correct, on the other hand, the position/posture updating unit 15 updates the position and/or posture of the mobile object, outputting the updating result from an output terminal 16. In addition, an estimation result of the position updated by the position/posture updating unit 15 is used by the position prediction unit 11 in an operation to predict a position for the next frame (or the present frame) as an estimation result of the position for the previous frame.

Figure 2:
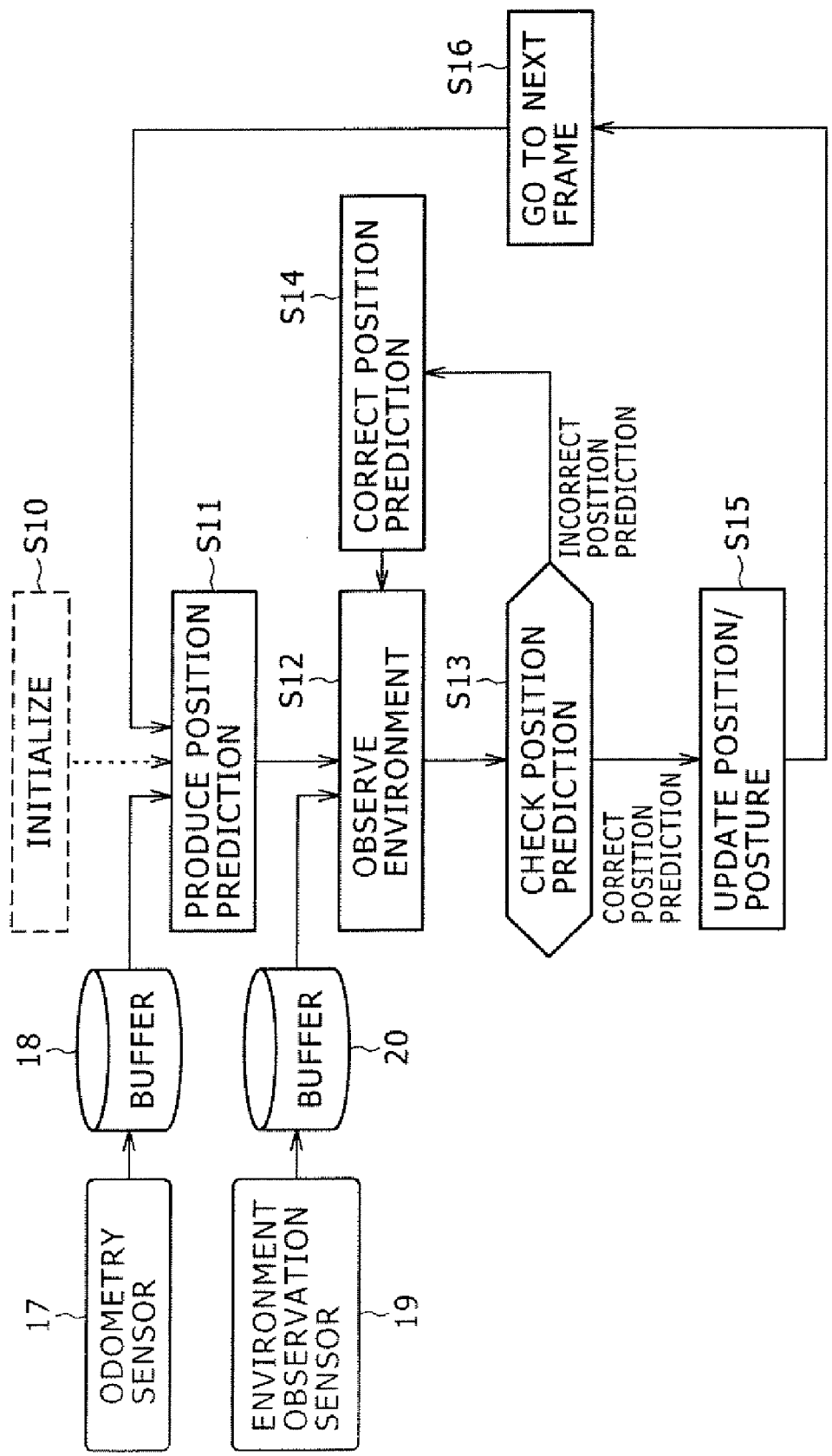
FIG. 2 shows a flowchart to be referred to in explanation of operations carried out by the position estimation apparatus.
Figure 9:
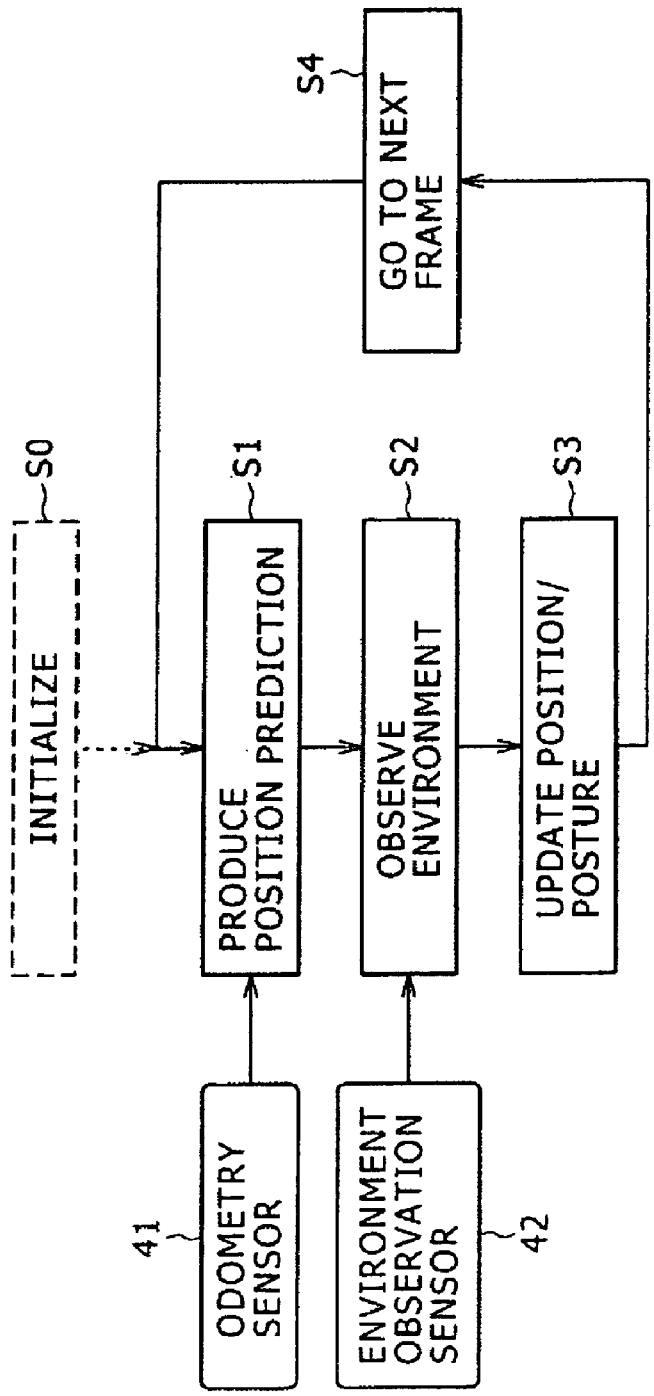
FIG. 9 shows a flowchart to be referred to in explanation of the algorithm of the conventional Kalman filter.

Next, the operation of the position estimation apparatus 10 is explained by referring to a flowchart shown in FIG. 2. This flowchart represents the processing procedure of a position estimation method intended for estimation of the position and/or posture of a robot. As shown in the figure, the flowchart begins with a step S10 at which the position estimation apparatus 10 carries out an initialization process. Then, at the next step S1, the position prediction unit 11 produces a position prediction, which is a prediction of the position of the robot. Subsequently, at the next step S12, the environment observation unit 12 measures an environment. Then, at the next step S13, the prediction-error check unit 13 produces a result of determination as to whether a position prediction produced by the position prediction unit 11 as a prediction of the position of the robot is correct or incorrect. Depending on the determination result to be described later in detail, the flow of the processing procedure goes on to a step S14 or S15. At the step S14, the position-prediction correction unit 14 corrects the incorrect position prediction. The flow of the processing procedure goes back to the step S12. At the step S15, on the other hand, the position/posture updating unit 15 updates the position and/or posture of the robot. The flow of the processing procedure goes on from the step S15 to a step S16 at which a process for the next frame is carried out. The processing procedure represented by the flowchart shown in FIG. 2 is basically close to the processing procedure shown in FIG. 9 as the processing procedure executed by the conventional Kalman filter system. However, the processing procedure represented by the flowchart shown in FIG. 2 includes the new step S13 of producing a result of determination as to whether a position prediction is correct or incorrect and the new step S1 of correcting the incorrect position prediction. These 2 new steps S13 and S14 are not steps technologically easy to come up with.

To put it in detail, at the state (position) prediction step S11, the position prediction unit 11 produce a state (position) prediction as a prediction of the state (the position) of the robot for the present frame from a sensor value generated by the odometry sensor 17 such as an acceleration sensor or a velocity sensor and from a result of estimating a system state for the previous frame. Since the value output by the odometry sensor 17 and the camera position of the preceding frame are past information, however, the robot position computed from the value output by the odometry sensor 17 is no more than a value given by a position prediction produced by the position prediction unit 11.

At the environment observation step S12, the environment observation unit 12 measures the environment of the mobile object by making use of the environment observation sensor 19 (or an image-taking sensor such as a camera). To put it concretely, the environment observation unit 12 takes an image of the environment of the robot by making use of an image-taking sensor mounted on the robot and, from the taken image, observes feature points. The feature points are marks that can be recognized in image processing. Examples of feature points are eyemarks and landmarks. At the environment observation step S12, the environment observation unit 12 observes the position of the robot by keeping track of every feature point from frame to frame.

At the environment observation step S12, it is possible to keep track of every feature point from frame to frame by determining a search range on the basis of the predicted position and/or the predicted posture, which have been found at the state prediction step S11.

Figure 3:
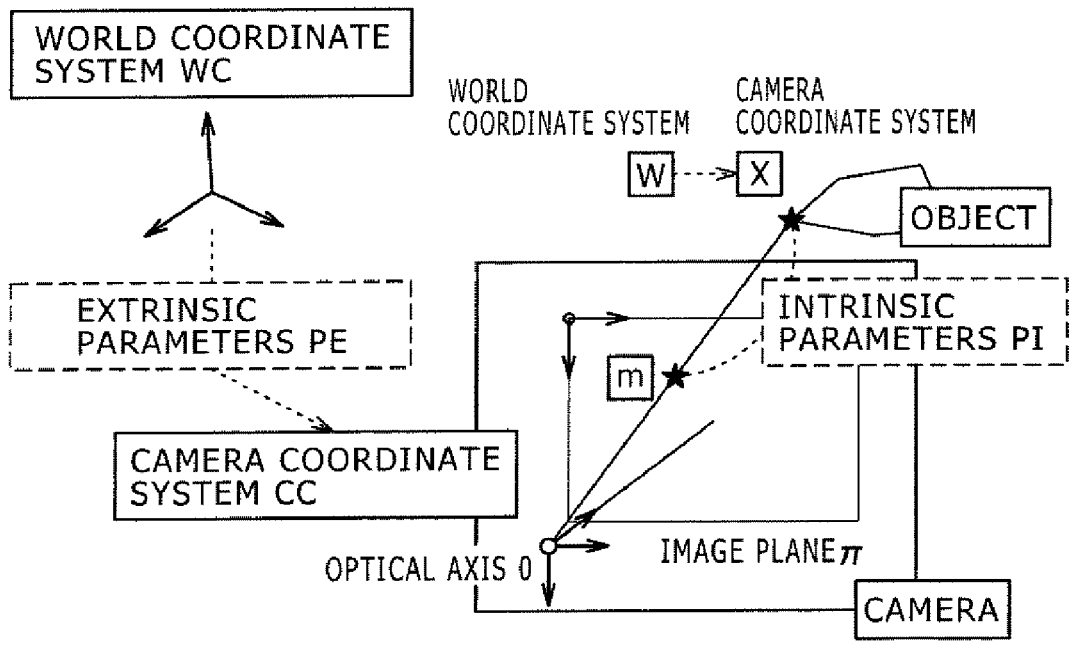
FIG. 3 is an explanatory diagram to be referred to in description of a pin-hole camera model.

The following description explains a case in which the image-taking sensor closely resembles a pin hole camera model. As shown in FIG. 3, the pin hole camera model uses parameters, which can be classified into 2 big categories, i.e., extrinsic parameters PE and intrinsic parameters PI. An extrinsic parameter PE is a parameter relevant to inter-camera factors such as the position and/or posture of the robot. On the other hand, an intrinsic parameter PI is a parameter relevant to a factor inherent in the camera.

As shown in FIG. 3, the extrinsic parameters PE represent positional and/or posture relations between a world coordinate system WC and a camera coordinate system CC in the three-dimensional space. Let us define coordinates w in the world coordinate system WC shown in FIG. 3 as follows:

$$w = [w_x, w_y, w_z]^T$$

$$W = [Wx, Wy, Wz]^T$$

By the same token, let us define coordinates x in the camera coordinate system CC in the three-dimensional space shown in the same figure as follows:

$$w=[w_x, w_y, w_z]^T.$$

In this case, the coordinates w and the coordinates x satisfy Eq. (1) given as follows:

$$x = R \cdot w + t \qquad (1)$$

where symbol R denotes a 3×3 rotating matrix whereas symbol t denotes a 3×1 translation matrix.

The intrinsic parameters represent a positional relation between the coordinates of the position of a pixel and the coordinates x in the camera coordinate system CC in the three-dimensional space. The intrinsic parameters are expressed in the form of a matrix A as follows:

$$A = \begin{bmatrix} -f \cdot k_u & f \cdot k_u \cdot \cot\theta & u_0 \\ 0 & -\dfrac{f \cdot k_v}{\sin\theta} & v_0 \\ 0 & 0 & 1 \end{bmatrix} \qquad (2)$$

In Eq. (2) given above, symbol f denotes a focal distance, symbol ku is a ratio of the coordinate of a pixel in the u-axis direction to a distance in the three-dimensional space, symbol kv is a ratio of the coordinate of a pixel in the v-axis direction to a distance in the three-dimensional space, symbols u0 and v0 denote the coordinates of the position of the center of an image plane Π, symbol θ denotes a skew of the u and v axes with respect to the optical axis o. The coordinates u0 and v0 are each expressed in terms of pixel units. The ratios ku and kv are also each referred to as a scale factor.

The coordinates $x=[x_x, x_y, x_z]^T$ defined in the camera coordinate system CC in the three-dimensional space and coordinates $\tilde{m}=[m_i, m_j, 1]^T$ of the position of a pixel on the image plane Π satisfy a positional relation expressed by Eq. (3) as follows:

$$\lambda \tilde{m} = A \cdot x \qquad (3)$$

where symbol λ denotes any arbitrary number.

The size of a search range is found from a covariance matrix $\Sigma_v$ of predicted deviations of the Kalman filter. On this case, a deviation is defined as a deviation between a result of observation and a predicted observation value computed in a prediction process. The covariance matrix $\Sigma_v$ for finding the size of a search range is expressed by Eq. (4) as follows:

$$\Sigma_v = \nabla H \cdot \Sigma_x \cdot \nabla H^T + \Sigma_s \qquad (4)$$

In Eq. (4) given above, symbol $\Sigma_x$ denotes a covariance matrix of an existence probability distribution for the position and/or posture of the robot and symbol ∇ denotes the Navratilova operator. That is to say, symbol ∇H denotes a result of applying the Navratilova operator to an H function, which is a function used on the right side of an equation obtained as a result of deforming Eq. (4) in order to get rid of λ. The equation obtained as a result of deforming Eq. (4) is $[m_i, m_j]^T = H(R, t, [X, Y, Z]^T)$. Thus, symbol ∇H denotes a partial differential matrix having each item thereof set at a value obtained as a result of partial differentiation of the H function with respect to one of input parameters. Symbol $\Sigma_s$ denotes a covariance matrix of observation noises generated during an observation process. The observation noises are assumed to conform to the normal distribution.

Figure 4:
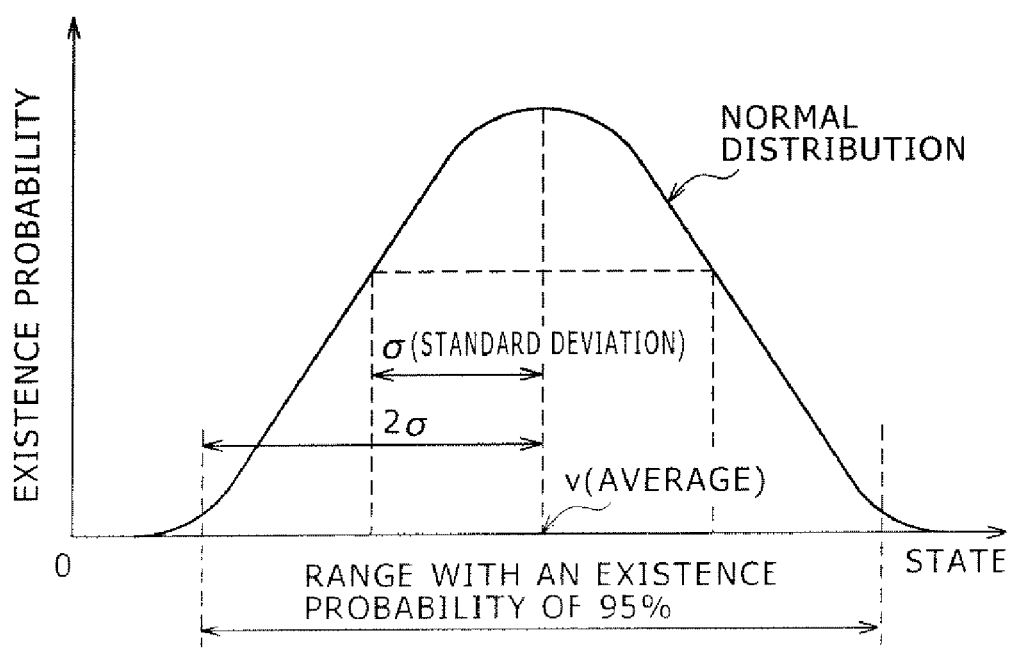
FIG. 4 is an explanatory diagram to be referred to in description of a normal distribution model.

The embodiment adopts the normal distribution model as the existence probability distribution cited above. FIG. 4 is an explanatory diagram showing the normal distribution model. The horizontal axis represents the state of the robot whereas the vertical axis represents the existence probability density indicating the probability that the robot exists in a particular state. A state range in which the mobile object exists is expressed in terms of a probability value obtained by integration of the function over the state range. As shown in FIG. 4, the probability that the mobile object exists in a range of ±two times the standard deviation σ of the normal distribution model is 95%. The range of ±two times the standard deviation σ is a range having its center coinciding with the average v of the normal distribution model, a right-side width of two times the standard deviation and a left-side width of two times the standard deviation. The range ±2σ shown in FIG. 4 is taken as the search range in the embodiment. Of course, the range ±3σ can also be taken as the search range. The probability that the mobile object exists in a range of ±3 times the standard deviation is 97.5%. The wider the search range, the higher the probability that the mobile object exists in the range. The wider the search range, however, the larger the amount of computation. It is thus desirable to change the width of the search range in accordance with the prevailing condition.

Figure 5:
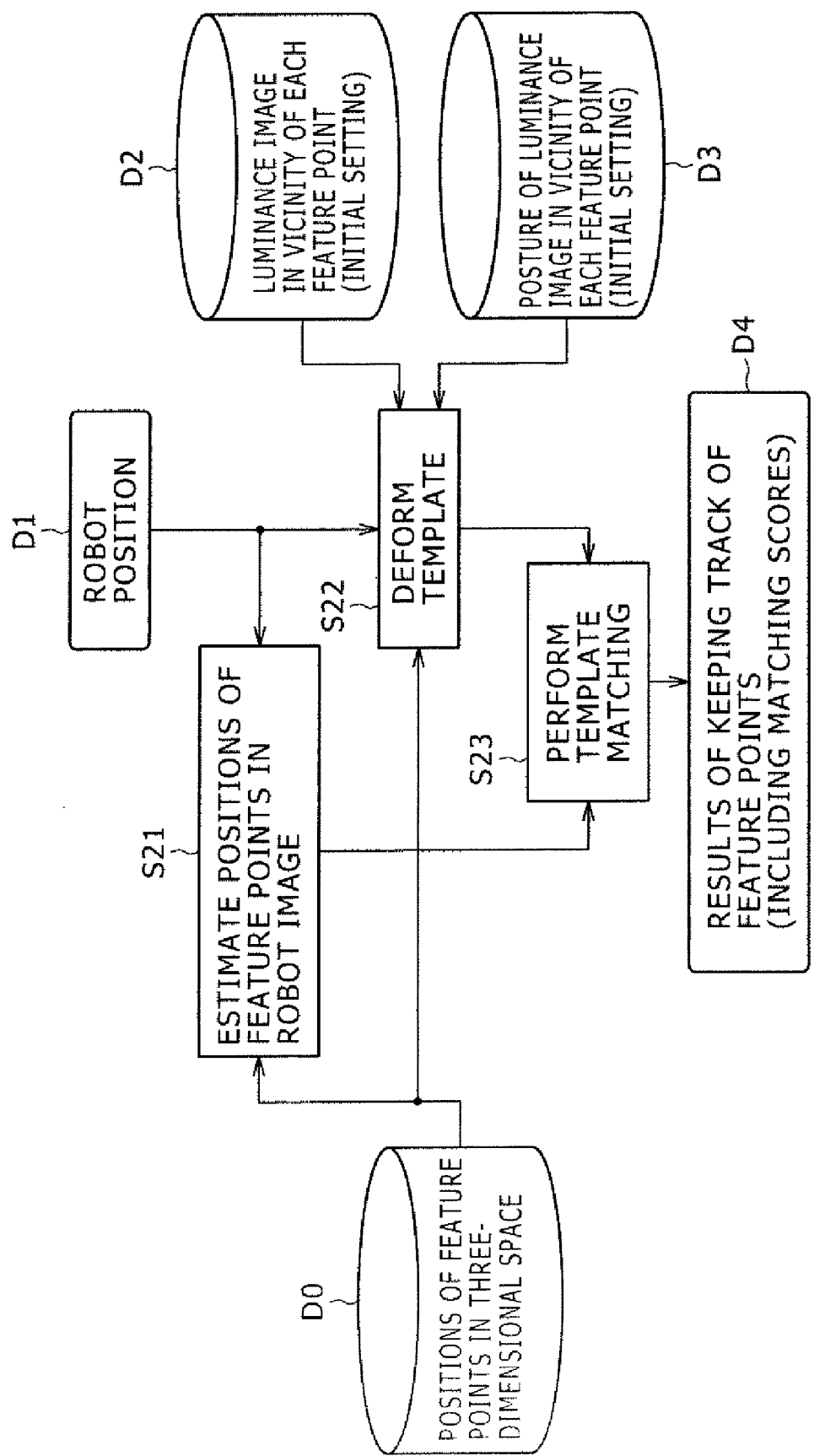
FIG. 5 is an explanatory diagram to be referred to in description of a template matching process for the vicinity of every feature point.

After the search range is determined at the environment observation step S12, a feature-point matching process is carried out in order to keel track of every feature point. There are a variety of feature-point matching methods, any one of which can be adopted. This embodiment adopts a template matching technique applied to a template in the vicinity of a feature point by making use of luminance information. FIG. 5 is an explanatory diagram referred to in description of the template matching technique applied to a template in the vicinity of a feature point. Let us assume for example that a position D0 stored in a hard disk HD is the position of a feature point. The position D0 is a position known in advance in a 3 dimensional space. Let us also assume that positional data D1 is positional data estimated by making use of the Kalman filter as the positional data of the robot. In this case, first of all, at a step S21 shown in FIG. 5, the environment observation unit 12 estimates the position of a feature point on the image. Then, at a step S22, the environment observation unit 12 deforms a template seen from the position of the robot as a template of the vicinity of the feature point in accordance with affinity constraints on the basis of luminance image data D2 (initially set) in the vicinity of the feature point and posture data D3 (initially set) of the luminance image in the vicinity of the feature pint. By carrying out the processes of the steps S21 and S22, a search range and a template are obtained. Thus, at a step S23, the template matching technique is implemented on the basis of these pieces of information, that is, the search range and the template. The result of the process carried out at the step S23 is resulting data D4 representing a feature-point locus on the previous frame of the feature point.

Figure 6A:
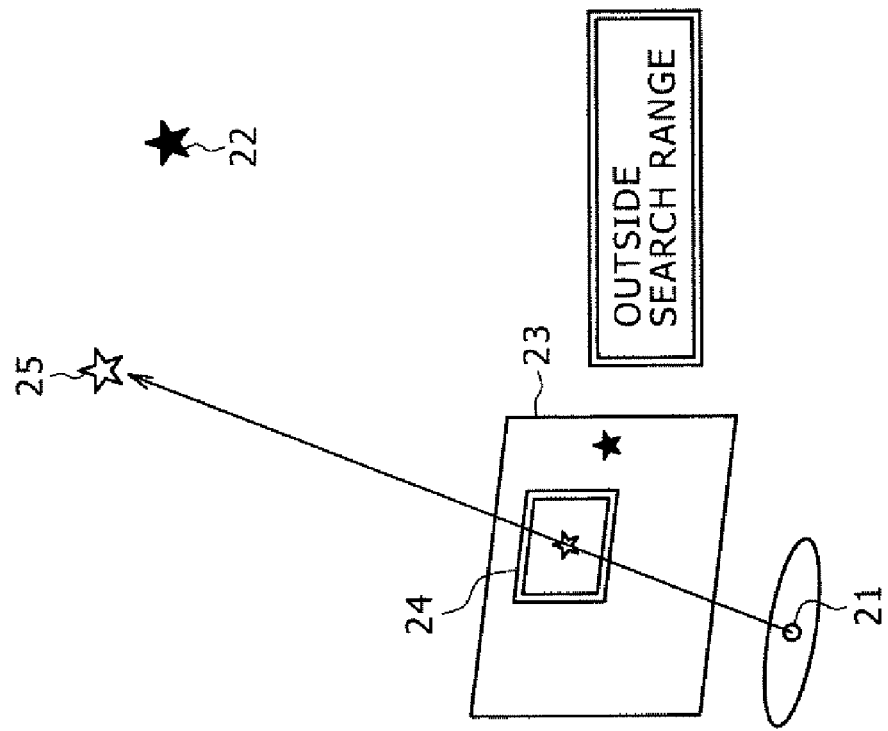
Figure 6B:
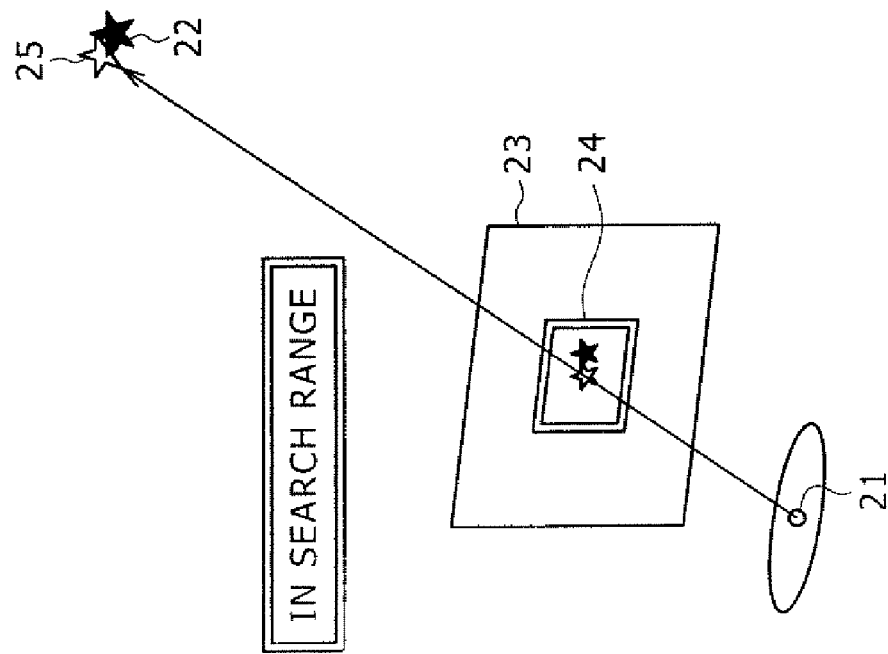
FIG. 6B is an explanatory diagram to be referred to in description of a case in which the position prediction is incorrect.

The following description explains a process carried out by the prediction-error check unit 13 at the step S13 of the flowchart shown in FIG. 2 to check a position prediction produced by the position prediction unit 11 as a prediction of the position of the robot in order to produce a result of determination as to whether the position prediction is correct or incorrect. If the estimated position and/or estimated posture of the robot are close respectively to the actual position and/or estimated posture of the robot, the operation to keep track of feature points is considered to be successful. If the estimated position and/or estimated posture of the robot deviate respectively from the actual position and/or estimated posture of the robot, on the other hand, the operation to keep track of feature points is considered to have ended in a failure. FIG. 6A is a diagram showing the case of a correct position prediction. On the other hand, FIG. 6B is a diagram showing the case of an incorrect position prediction. If the prediction of a camera focus position 21 is correct as shown in FIG. 6A, the actual position of a feature point 22 is in a prediction search range 24 of an image plane 23 as a position in close proximity to a feature point position 25 predicted from the camera position. If the prediction of the camera focus position 21 is incorrect as shown in FIG. 6B, on the other hand, actual position of the feature point 22 is in the outside of the prediction search range 24 of the image plane 23 as a position shifted far away from the feature point position 25 predicted from the camera position. In a matching scoring process, the result of an operation to keep track of each feature point is examined in order to determine whether the result is correct or incorrect, that is, whether the operation to keep track of the feature point has been ended successfully or has been ended in a failure as follows.

To put it concretely, at the step S13 executed by the prediction-error check unit 13 to check a position prediction produced by the position prediction unit 11 as a prediction of the position of the mobile object in order to produce a result of determination as to whether the position prediction is correct or incorrect, the number of feature points passing the track-keeping operation successfully and the number of feature points ending the track-keeping operation in a failure are counted. If the operation to keep track of feature points as a whole is completed at a success rate higher than a certain probability, the prediction-error check unit 13 produces a determination result is correct. Otherwise, the prediction-error check unit 13 produces a determination result is incorrect.

Next, a process carried out by the position/posture updating unit 15 at the step S15 to update the position and/or posture of the robot is explained as follows. The position and/or posture of the robot are updated on the basis of an observation result obtained at the step S12. A method to update the position and/or posture (or the state) of the robot is the same as a general extended Kalman filtering method described in Non-Patent Document 1 as a non-linear technique. In this case, the state of the robot is the position and/or posture of the robot.

Next, a process carried out by the position-prediction correction unit 14 at the step S14 to correct a position prediction is explained as follows. If the determination result produced at the step S13 indicates that the position prediction is incorrect, the position prediction is corrected at the step S14. Since the position prediction of the robot is not correct, the existence probability distribution model shown in FIG. 4 is changed in order to increase the value of the standard deviation of the model. With an increased value of the standard deviation of the existence probability distribution model, however, the ambiguity in the model for the position and/or posture of the robot position is also increased. Nevertheless, the width of the predicted-position range in which the robot may likely exist is increased as well so as to cover the actual state.

Figure 7A:
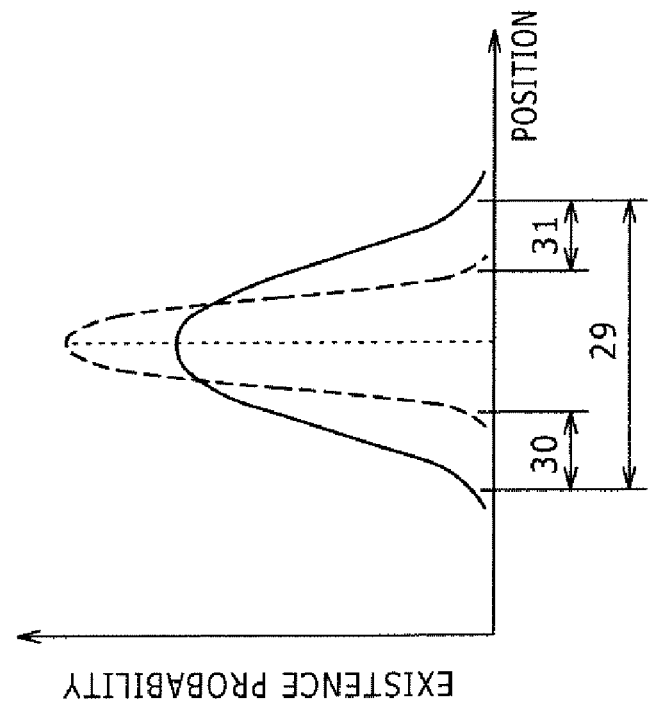

The following description explains position-prediction correction processing in which the position of the robot is expressed in terms of a one-dimensional variable. With the position of the robot expressed in terms of one-dimensional coordinates, the existence probability distribution can be expressed by ones shown in FIG. 7. If the determination result produced at the step S13 indicates that the position prediction is incorrect as shown in FIG. 7A, the actual position of the robot is conceivably a position outside the range 26 of the existence probability distribution.

Figure 7B:
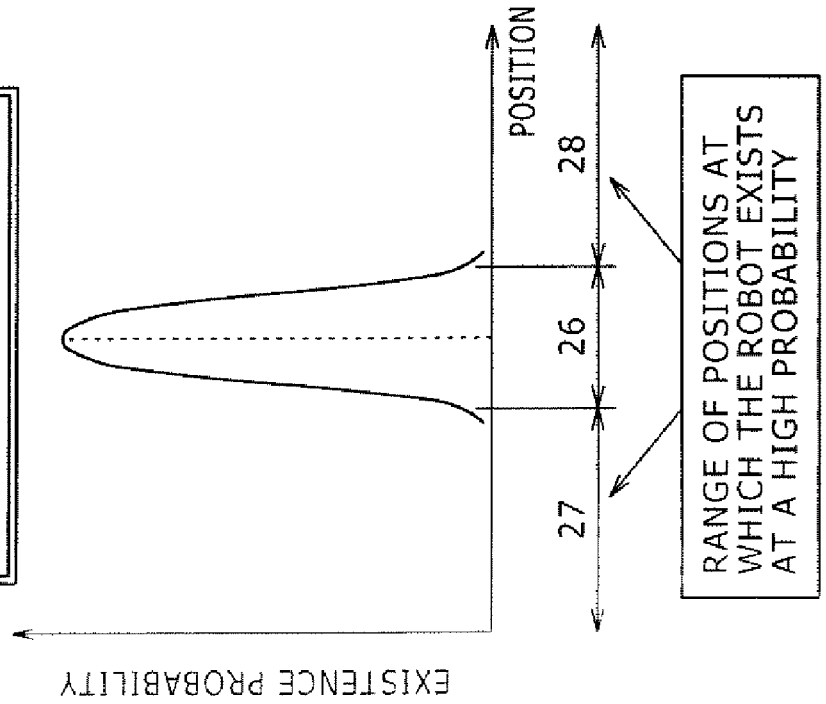
FIG. 7B is an explanatory diagram to be referred to in description of correction of the incorrect prediction.
Figure 8:
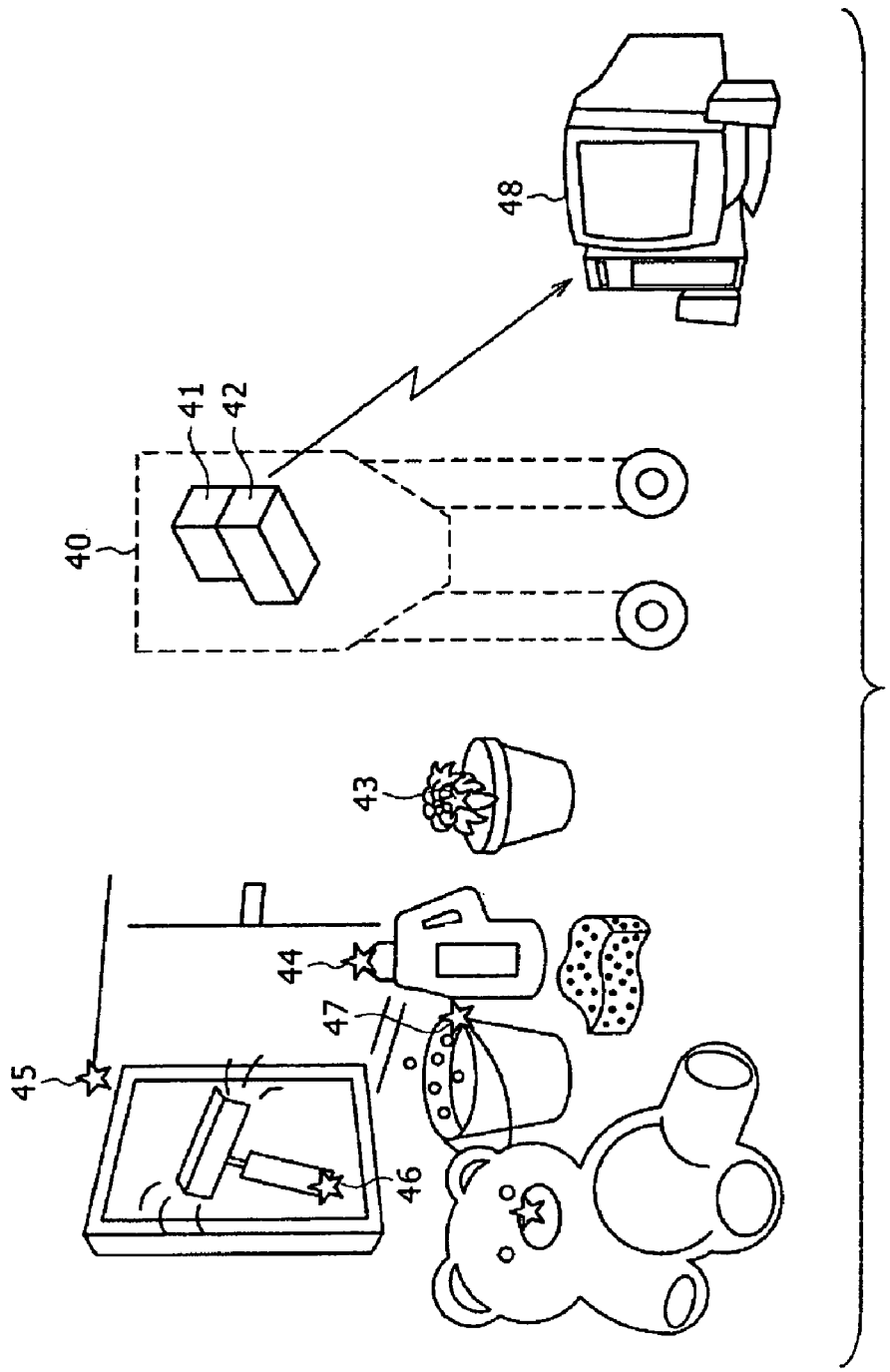
FIG. 8 is a diagram showing a robot employing a conventional prediction filter, an odometry sensor and a vision sensor, which are mounted on the robot, and existing in an environment in a fixed (unchanging) state.

In other words, if the determination result produced at the step S13 indicates that the prediction process has been carried out by the position prediction unit 11 incorrectly at the step S11, the position prediction produced by the position prediction unit 11 at the step S11 is wrong. In this case, the actual position of the robot is conceivably a position in a range 27 or 28, which is a range outside the range 26 of the existence probability distribution. In order to cope with this problem, in the embodiment, the standard deviation σ of the existence probability distribution for the position of the robot is increased as shown in FIG. 7B. In consequence, with an increased value of the standard deviation of the existence probability distribution model, the ambiguity in the model for the position of the robot position is also increased. However, the width of a predicted-position range 29 in which the robot may likely exist is increased as well to include additional ranges 30 and 31 besides the range 26. Even though the above explanation is given for position-prediction correction processing in which the position of the robot is expressed in terms of a one-dimensional variable, the explanation also holds true of position-prediction correction processing in which the state of the robot is expressed in terms of a two-dimensional variable or a variable of more dimensions. That is to say, also in the case in which the state of the robot is expressed in terms of a two-dimensional variable or a variable of more dimensions, a position prediction is corrected similarly by increasing the value of the standard deviation of the existence probability distribution model.

After the process carried out by the positions prediction correction unit 14 at the step S14 to correct a position prediction is completed, the process carried out by the environment observation unit 12 at the step S12 is repeated in order to produce a position prediction for the same frame (or for the same point of time) without making a transition to processing for the next frame (or for the next point of time). As a matter of fact, the processes of the steps S12, S13 and S14 are carried out repeatedly till the determination result produced at the prediction checking step S13 to determine whether the prediction process is correct or incorrect indicates that the prediction process has been carried out by the position prediction unit 11 correctly at the step S11. If the position prediction deviates much from the actual position, however, a feature point to be subjected to a track keeping operation may not exist in the image in some cases, raising a problem that the operation to keep rack of the feature point would not carried out successfully.

In the mean time, sensor values generated by the odometry sensor and the environment observation sensor are stored in the buffers 18 and 20 respectively. The process carried out at the step S14 to correct a position prediction may raise a problem that the process carried out at the step S11 to produce a position prediction and the process carried out at the step S12 to keep track of feature points lag behind the measurements carried out by the odometry sensor and the environment observation sensor at high speeds. Since sensor values generated in the past by the odometry sensor and the environment observation sensor are stored in the buffers 18 and 20 respectively, however, these stored sensor values can be used in the processes carried out at the steps S11 and S12 in order to solve the problem.

Next, the covariance matrix $\Sigma_x$ of the existence probability distribution is explained in detail as follows. First of all, a state variable vector x is expressed by Eq. (5) given below. In Eq. (5), symbol x denotes the position of the camera, symbol ω denotes the posture of the camera, symbol P1 denotes the position of a feature point #1, and symbol $P_n$ denotes the position of a feature point #n.

$$x = \begin{bmatrix} x \\ \omega \\ P_1 \\ \vdots \\ P_N \end{bmatrix} \quad (5)$$

In this case, the covariance matrix Σx of the state variable x is expressed by Eq. (6) given below. The row and column items of the covariance matrix Σx expressed by Eq. (6) are each a covariance value corresponding to a state variable component.

$$\Sigma_x = \begin{bmatrix} \Sigma_{xx} & \Sigma_{x\omega} & \cdots & \Sigma_{xP_n} \\ \Sigma_{\omega x} & \Sigma_{\omega\omega} & \cdots & \Sigma_{\omega P_n} \\ \vdots & \vdots & \ddots & \vdots \\ \Sigma_{P_n x} & \Sigma_{P_n \omega} & \cdots & \Sigma_{P_n P_n} \end{bmatrix} \quad (6)$$

In this case, the Markov chain is taken into consideration as the position estimation method of the present invention. In accordance with the Markov chain, a past to be taken into consideration refers to a process at only the preceding point of time. Pasts leading ahead of the process at the preceding point of time are not taken into consideration. This is expressed by Eq. (7) as follows:

$$x_{t+1} \leftarrow f(x_t) \quad (7)$$

If the Markov chain is taken into consideration, the processes carried out at the steps of the flowchart shown in FIG. 2 can be explained as follows. First of all, at the position prediction step, a prediction of the position of the mobile object for the next frame is found from a velocity x' generated by the odometry sensor as the velocity of the mobile object and an angular velocity ω' generated by the odometry sensor as the angular velocity of the mobile object. In this process, Eq. (8) given below is used. In Eq. (8), symbol $x^-_{t+1}$ denotes a predicted state at a time t+1, symbol $\Sigma^-_{xt+1}$ denotes the covariance matrix of the predicted state xt+1 at the time t+1, symbol $\Sigma_a$ denotes predicted noises (the velocity of the dispersion matrix $\Sigma_a$ with an average of 0) and symbol ∇ denotes the Navratilova operator. Thus, symbol ∇F denotes a result of applying the Navratilova operator to the F function. The result of applying the Navratilova operator to the F function is a matrix for a function F. That is to say, the matrix ∇F is a partial differential matrix having each item thereof set at a value obtained as a result of linear partial differentiation of the function F with respect to one of state variables.

$$x^-_{t-1} = \begin{bmatrix} x^-_{t+1} \\ \omega^-_{t+1} \\ P^-_{1t+1} \\ \vdots \\ P^-_{Nt+1} \end{bmatrix} \leftarrow F(x_t, \dot{x}_t, \dot{\omega}_t) = \begin{bmatrix} x_t + \dot{x}_t \\ \omega_t + \dot{\omega}_t \\ P_{1t} \\ \vdots \\ P_{Nt} \end{bmatrix} \quad (8)$$

$$\Sigma^-_{xt+1} \leftarrow \nabla F \cdot \Sigma_{xt} \cdot \nabla F^T + \Sigma_a$$

Next, the environment observation step is explained. From the predicted state $\Sigma^-_{xt+1}$ at a time (t+1), the predicted positions of the camera and a feature point are known. Thus, a position projected on the camera image as the position of the feature point can be predicted. Eq. (9) given below is an equation for computing a predicted projected position $\hat{s}_{\#t+1}$ of a feature point #. In Eq. (9), symbol λ represents certain numbers, symbol A denotes a matrix of camera internal parameters and symbol R ($\omega^-_{t+1}$) denotes a rotating matrix.

$$\hat{s}_{\#t+1} = H(x^-_{t+1}) = [ij]^T,$$

where $$\lambda[ij1]^T = A \cdot R(\omega^-_{t+1})(P^-_{\#t+1} - x^-_{t+1}) \quad (9)$$

Let us assume that symbol $s_{\#t+1}$ denotes a position observed by adoption of a tracking technique separately from the predicted position $\hat{s}_{\#t+1}$ cited above as the position of the feature point # on the image. In this case, symbol v̂ denotes the difference between the observed position $s_{\#t+1}$ and the predicted position $\hat{s}_{\#t+1}$. A dispersion matrix $\Sigma_{\hat{v}}$ of the differences v̂ between the observed position $s_{\#t+1}$ and the predicted position $\hat{s}_{\#t+1}$ can be found in accordance with Eq. (10) as follows:

$$\Sigma_v \leftarrow \nabla H_x \cdot \Sigma_{xt+1}^- \cdot \nabla H_x^T + \Sigma_s \quad (10)$$

In Eq. (10) given above, symbol ∇ denotes the Navratilova operator. Thus, symbol ∇H denotes a result of applying the Navratilova to a function H. The result of applying the Navratilova to a function H is a matrix ∇H, which is a partial differential matrix having each item thereof set at a value obtained as a result of linear partial differentiation of the function H with respect to one of state variables. Symbol $\Sigma_s$ denotes a matrix of computation errors. Symbol v̂ denotes the difference between the observed position of a feature point on the image and the predicted position of the feature point on the image. The difference v̂ is expressed in terms of pixel units. Assuming that the difference v' conforms to a distribution with an average of 0 and dispersion according to the dispersion matrix $\Sigma_{\hat{v}}$, the probability that the observed position $s_{\#t+1}$ is in a range having a center coinciding with the predicted position $\hat{s}_{\#t+1}$ and a width of two times the standard deviation (=2.0*sqrt ($\Sigma_{\hat{v}}$)) can be said to be 95%. In other words, by searching the range having a center coinciding with the predicted position $s'_{\#t+1}$ and a width of two times the standard deviation (=2.0*sqrt ($\Sigma_{\hat{v}}$)), the probability that search operation is successful is 95%.

Next, the position/posture updating step is explained. On the basis of observation values obtained at the environment observation step, a pixel v̂ is found by making use of Eq. (11) given as follows.

$$\hat{v} = s_{\#t+1} - \hat{s}_{\#t+1} \quad (11)$$

Then, a Kalman gain W is found by making use of Eq. (12) given below whereas the state variable xt+1 and the covariance matrix $\Sigma_{xt+1}$ are updated in accordance with Eqs. (13) and (14) respectively as follows:

$$W = \Sigma^-_{xt+1} \cdot \nabla H^T_x \cdot \Sigma^{-1}_v \quad (12)$$

$$X_{t+1} \leftarrow x_{xt+1}^- - W\hat{v} \quad (13)$$

$$\Sigma_{xt+1} \leftarrow \Sigma^-_{\#t+1} - W \cdot \Sigma_{\hat{v}} \cdot W^T \quad (14)$$

The above processing is processing carried out for one frame.

In addition, at the prediction checking step S13 to produce a result of determination as to whether the prediction process is correct or incorrect in the course of the processing carried out for one frame, the difference v̂ found at the environment observation step as a difference between the observed position $s_{\#t+1}$ and the predicted position $\hat{s}_{\#t+1}$ may be known to be a difference outside the range having a center coinciding with the predicted position $\hat{s}_{\#t+1}$ on the image and a width of two times the standard deviation (=2.0*sqrt ($\Sigma_{\hat{v}}$)) found from the dispersion matrix $\Sigma_{\hat{v}}$ of the difference $\hat{v}$. As described above, symbol $s_{\#t+1}$ denotes a position observed by adoption of a tracking technique separately from the predicted position $\hat{s}_{\#t+1}$ as the position of the feature point # on the image. In this case, the estimation of the positional relation between the feature point # and the camera is determined to be incorrect. Speaking in other words in terms of a tracking operations if the tracking operation in the range having a center coinciding with the predicted position $\hat{s}_{\#t+1}$ on the image and a width of two times the standard deviation (=2.0*sqrt ($\Sigma_{\hat{v}}$)) ends in a failure, the estimation of the positional relation between the feature point # and the camera is determined to be incorrect.

If the estimation for at least half the number of feature points included in a group of feature points expected to be included in the camera frame is determined to be incorrect, the estimation for all state variables is also determined to be incorrect.

Next, the position-prediction correction step is explained. At the position prediction step, a state in which the estimation of all state variables is incorrect is taken as a state of an incorrect estimation of the position of the camera.

In the present invention, a statement saying that the entire estimation is incorrect is equivalent to a statement declaring an incorrect estimation of the position of the camera. Thus, the incorrect entire estimation can be handled by increasing the dispersion of the state variable of the camera. The process to increase the dispersion of the state variable of the camera is expressed by Eq. (15) as follows.

$$\Sigma_{xt+1}^{-} \leftarrow \Sigma_{xt+1}^{-} + \Sigma_{modify} = \begin{bmatrix} \Sigma_{xx} & \Sigma_{x\omega} & \Sigma_{xP_1} & \cdots & \Sigma_{xP_n} \\ \Sigma_{\omega x} & \Sigma_{\omega\omega} & \Sigma_{\omega P_1} & \cdots & \Sigma_{\omega P_n} \\ \Sigma_{P_1 x} & \Sigma_{P_1 \omega} & \Sigma_{P_1 P_1} & \cdots & \Sigma_{P_1 P_n} \\ \vdots & \vdots & \vdots & \ddots & \vdots \\ \Sigma_{P_1 x} & \Sigma_{P_n \omega} & \Sigma_{P_n P_1} & \cdots & \Sigma_{P_n P_n} \end{bmatrix} + \begin{bmatrix} \Sigma_{xx}' & \Sigma_{x\omega}' & 0 & \cdots & 0 \\ \Sigma_{\omega x}' & \Sigma_{\omega\omega}' & 0 & \cdots & 0 \\ 0 & 0 & 0 & \cdots & 0 \\ \vdots & \vdots & \vdots & \ddots & \vdots \\ 0 & 0 & 0 & \cdots & 0 \end{bmatrix} \quad (15)$$

If the dispersion of the position and/or posture of the camera increase, the value of the dispersion of the difference $\hat{v}$ between the observation value $s_{\#t+1}$ and the predicted value $\hat{s}_{\#t+1}$ at the observation phase also increases as shown by Eq. (16) as follows:

$$\Sigma_{\hat{v}} \leftarrow \nabla H_x \cdot \Sigma_{xt+1}^{-} \cdot \nabla H_x^T + \Sigma_s \quad (16)$$

The above equation indicates that the width of the search range increases.

It should be understood by those skilled in the art that various modifications, combinations, sub comb-nations and alterations may occur depending on within the scope of the appended claims or the equivalents thereof.

What is claimed is:

1. A position estimation apparatus for a mobile object, said position estimation apparatus comprising:
   a position prediction unit configured to drive a position prediction filter to carry out a filtering process on a sensor value generated by an odometry sensor mounted on said mobile object as a sensor value for the present frame and a result of estimating the position of said mobile object for a previous frame in order to produce a position prediction as a prediction of said position of said mobile object for the present frame;
   an environment observation unit configured to measure the environment of said mobile object by making use of an environment observation sensor other than said odometry sensor used by said position prediction unit and observing positions of feature points in said environment by keeping track of said feature points from frame to frame;
   a prediction-error check unit configured to produce a result of determination as to whether a position prediction produced by said position prediction unit as a prediction of the position of said mobile object is correct or incorrect on the basis of a result generated by said environment observation unit as a result of an operation to keep track of said feature points in said environment;
   a position prediction correction unit configured to correct a position prediction produced by said position prediction unit as a prediction of the position of said mobile object if said prediction-error check unit produces a determination result indicating that said position prediction is incorrect; and
   a position/posture updating unit configured to update the position and/or posture of said mobile object if said prediction-error check unit produces a determination result indicating that a position prediction produced by said position prediction unit as a prediction of the position of said mobile object is correct.

2. The position estimation apparatus according to claim 1 wherein said environment observation unit finds a search range by making use of a position and/or a posture, which are predicted by said position prediction unit, and keeps track of said feature points.

3. The posit on estimation apparatus according to claim 2 wherein said environment observation unit:
   estimates positions of said feature points from positions known in advance as positions of said feature points in a three-dimensional space and from data estimated by a Kalman filter as the positional data of said mobile object;
   deforms a template seen from the position of said mobile object as a template of the vicinity of each of said feature points in accordance with affinity constraints from luminance image data in the vicinity of each of said feature points and from posture data of a luminance image in said vicinity of each of said feature points; and
   keeps track of said feature points by adoption of a template matching technique on the basis of said search range and said templates.

4. The position estimation apparatus according to claim 1 wherein said prediction-error check unit:
   counts the number of feature points each successfully passing an operation carried out by said environment observation unit to keep track of said feature points and the number of feature points failing in the same operation; and
   produces a determination result indicating that a position prediction produced by said position prediction unit as a prediction of the position of said mobile object is correct if said operation to keep track of feature points has been carried out by said environment observation unit at a success rate higher than a certain probability; or otherwise, produces a determination result indicating that said position prediction produced by said position prediction unit as a prediction of the position of said mobile object is incorrect.

5. The position estimation apparatus according to claim 1 wherein said position/posture updating unit makes said position prediction unit use an estimation result of a position, which has been updated by said position/posture updating unit as the position of said mobile object, in an operation to produce a position prediction for the next frame as an estimation result of the position of said mobile object for the previous frame.

6. The position estimation apparatus according to claim 2 wherein said position prediction correction unit changes an existence probability distribution model showing a distribution of probabilities of existence of said mobile object in order to increase the value of the standard deviation of said existence probability distribution model and hence increase the width of said search range used by said environment observation unit if said prediction-error check unit produces a determination result indicating that a position prediction produced by said position prediction unit as a prediction of the position of said mobile object is incorrect.

7. A position estimation method for a mobile object, said position estimation method comprising the steps of:
   driving a position prediction filter to carry out a filtering process on a sensor value generated by an odometry sensor mounted on said mobile object as a sensor value for the present frame and a result of estimating the position of said mobile object for a previous frame in order to produce a position prediction as a prediction of the position of said mobile object for the present frame;
   measuring the environment of said mobile object by making use of an environment observation sensor other than said odometry sensor used in said position prediction process and observing positions of feature points in said environment by keeping track of said feature points from frame to frame;
   producing a result of determination as to whether a position prediction produced in said position prediction process as a prediction of the position of said mobile object is correct or incorrect on the basis of a result generated in said environment observation process as a result of an operation to keep track of said feature points in said environment;
   correcting a position prediction produced in said position prediction process as a prediction of the position of said mobile object if said prediction-error check process produces a determination result indicating that said position prediction is incorrect; and
   updating the position and/or posture of said mobile object if said prediction-error check process produces a determination result indicating that a position prediction produced in said position prediction process as a prediction of the position of said mobile object is correct.

8. A recording medium configured to record a position estimation program to be executed by a position estimation apparatus configured to predict the position of a mobile object wherein said position estimation program comprises:
   a position prediction process of driving a position prediction filter to carry cut a filtering process on a sensor value generated by an odometry sensor mounted on said mobile object as a sensor value for the present frame and a result of estimating the position of said mobile object for a previous frame in order to produce a position prediction as a prediction of the position of said mobile object for the present frame;
   an environment observation process of measuring the environment of said mobile object by making use of an environment observation sensor other than said odometry sensor used in said position prediction process and observing positions of feature points in said environment by keeping track of said feature points from frame to frame;
   a prediction-error check process of producing a result of determination as to whether a position prediction produced in said position prediction process as a prediction of the position of said mobile object is correct or incorrect on the basis of a result generated in said environment observation process as a result of an operation to keep track of said feature points in said environment;
   a position prediction correction process of correcting a position prediction produced in said position prediction process as a prediction of the position of said mobile object if said prediction-error check process produces a determination result indicating that said position prediction is incorrect; and
   a position/posture updating process of updating the position and/or posture of said mobile object if said prediction-error check process produces a determination result indicating that a position prediction produced in said position prediction process as a prediction of the position of said mobile object is correct.

* * * * *